May 9, 1933. C. E. QUICK 1,908,539
MEANS FOR COATING BAKERY GOODS
Filed Feb. 24, 1932 4 Sheets-Sheet 1

Inventor:
Claude E. Quick
By Luther Johns,
Atty.

May 9, 1933.  C. E. QUICK  1,908,539
MEANS FOR COATING BAKERY GOODS
Filed Feb. 24, 1932  4 Sheets-Sheet 2
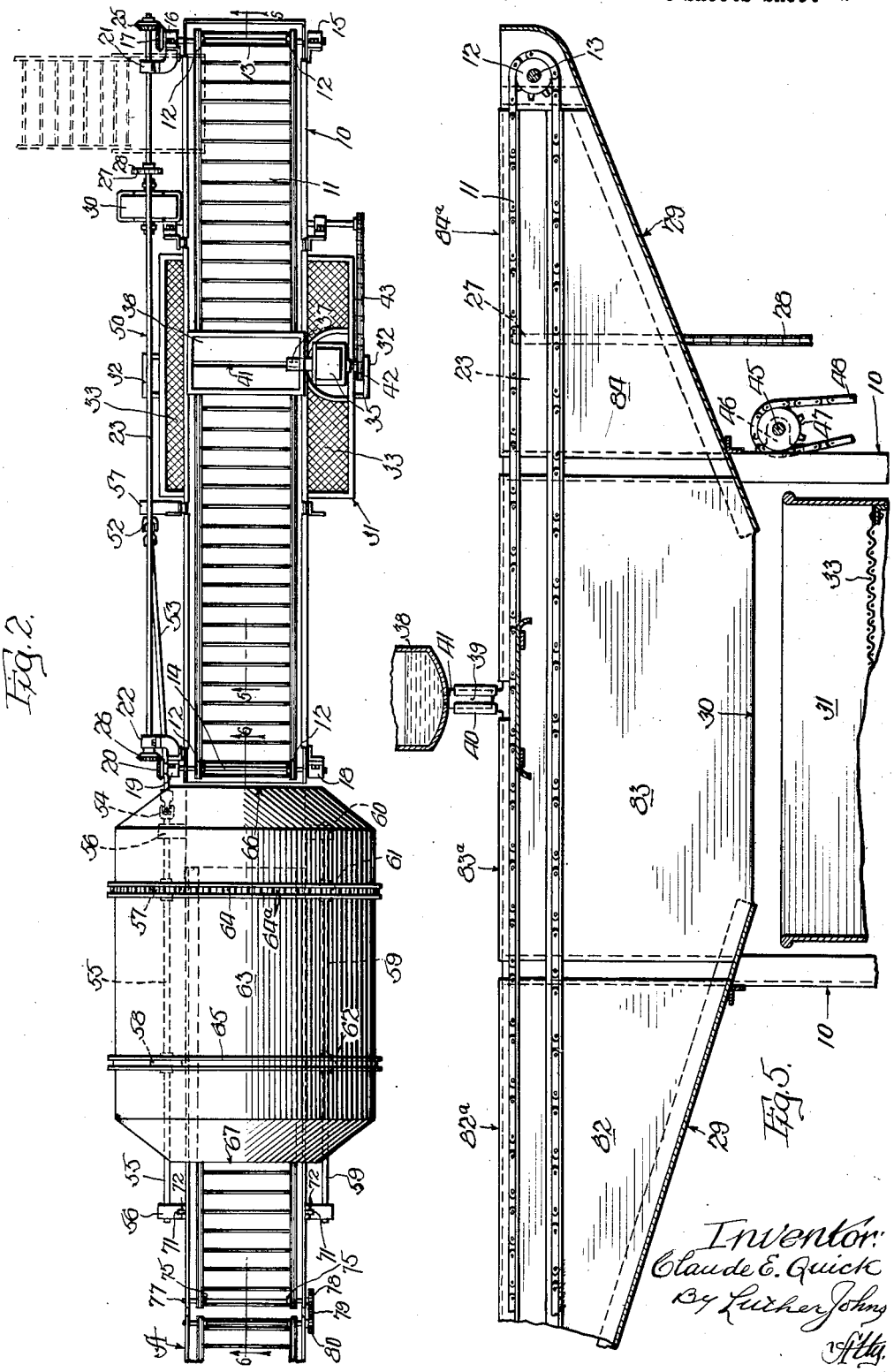

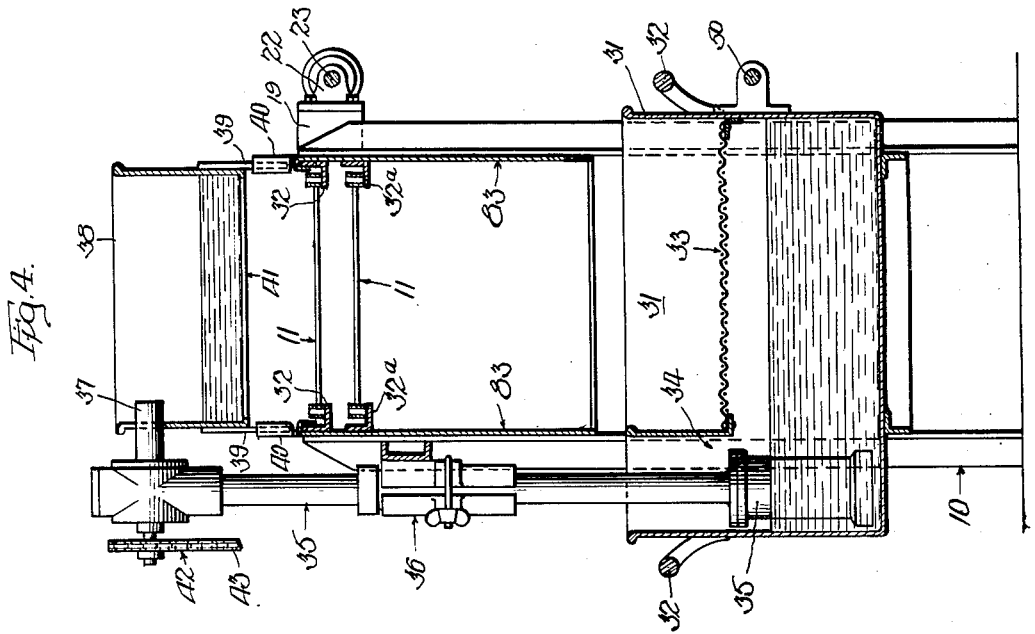
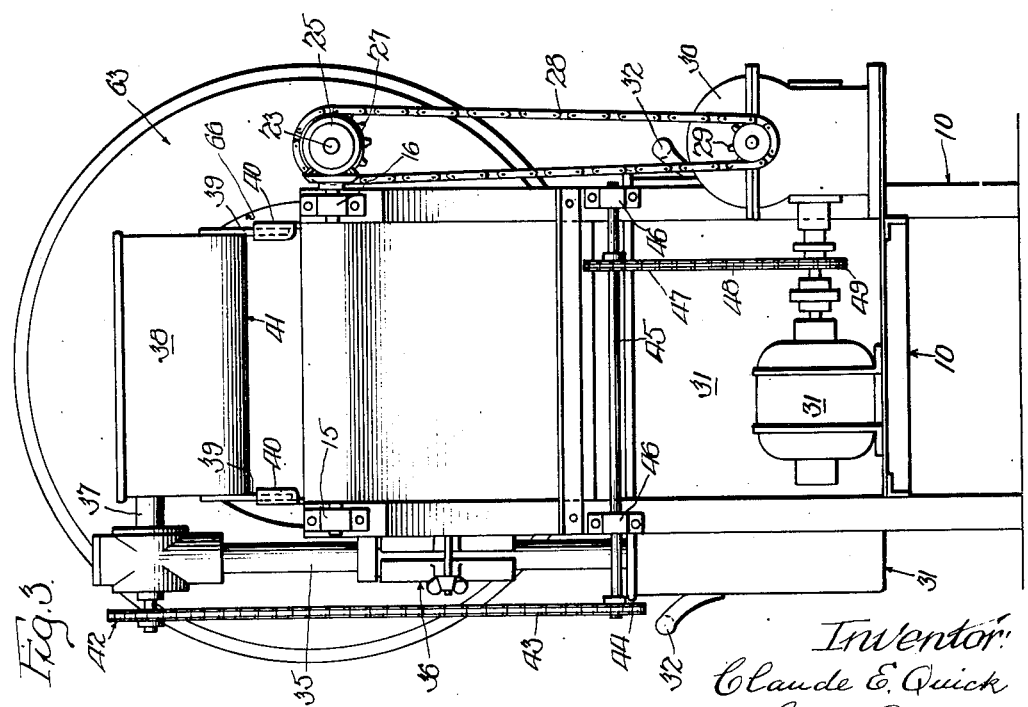

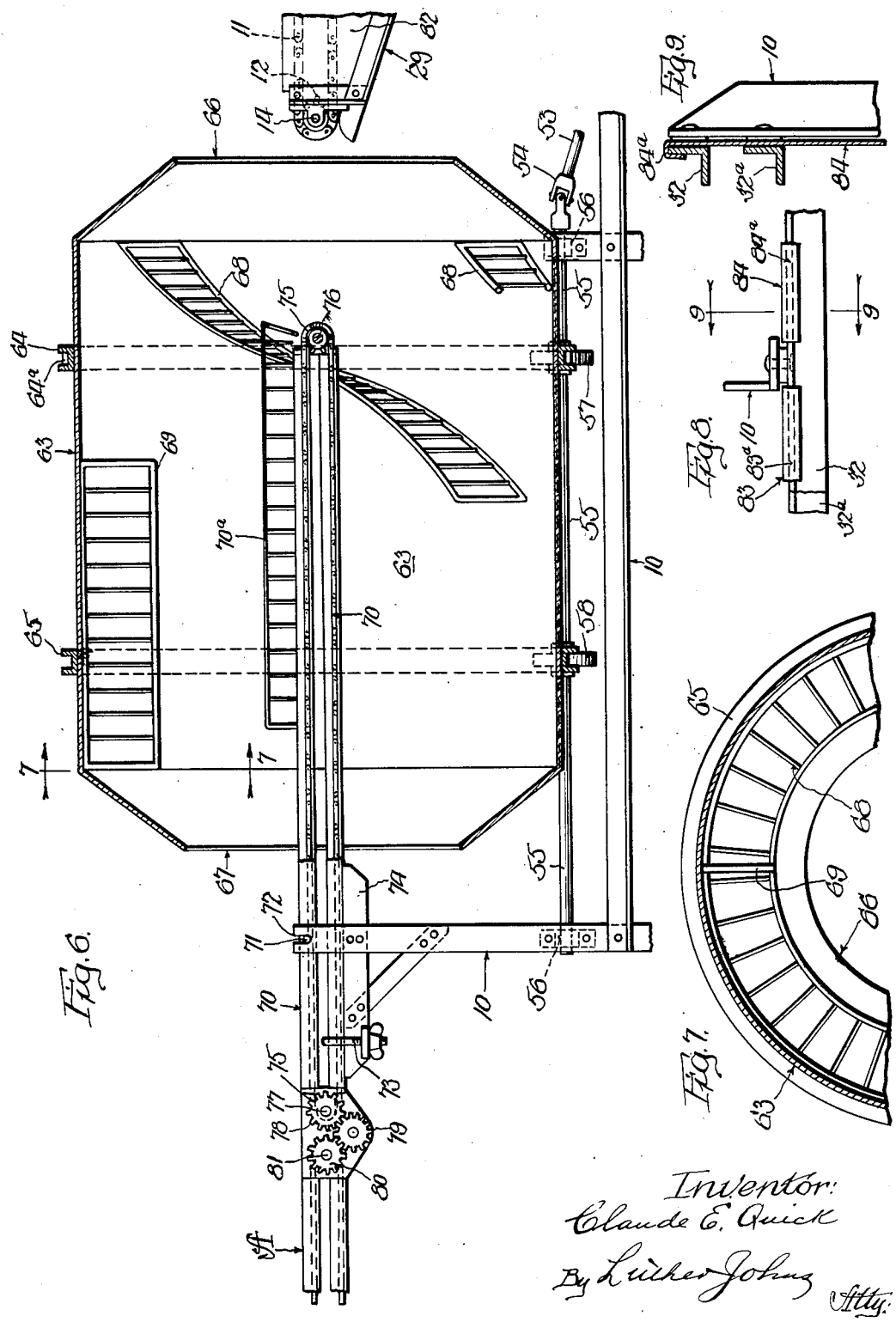

Patented May 9, 1933

1,908,539

UNITED STATES PATENT OFFICE

CLAUDE E. QUICK, OF GLENDALE, CALIFORNIA, ASSIGNOR TO INTERSTATE BAKERIES CORPORATION, OF KANSAS CITY, MISSOURI, A CORPORATION OF DELAWARE

MEANS FOR COATING BAKERY GOODS

Application filed February 24, 1932. Serial No. 594,865.

This invention relates to a means for coating bakery goods, especially those of smaller size such as doughnuts, cup cakes, variety cakes, etc. Heretofore such goods have been coated by hand in various ways, which was relatively expensive, slow and tiresome, and the goods coated did not have a uniform appearance. In some instances it is desirable to embellish the goods after coating them, which was also done slowly and expensively by hand, and it was also difficult to regulate the amount of the embellishing material placed on the articles.

The chief objects of the invention are to produce such iced and also such iced-and-embellished goods at a saving of cost, time and labor, and to provide more uniformly coated and more attractive goods.

In obtaining these results I provide a machine having means for conducting the goods in a path at a uniform and fairly rapid rate of speed, and having means to coat the goods while they are being conducted through the machine. In the device shown I first coat the goods with an icing and then cause them to be rolled into a substance that will adhere to the icing, and the goods are then discharged from the machine. The goods are thus uniformly coated with the icing while they are in motion and they then travel a substantial distance to allow the icing to set somewhat before being rolled into the substance for embellishing them.

According to the construction shown certain of the working elements and some of the parts are removably attached to facilitate the cleaning of the machine. Other and further objects and advantages will appear hereinafter. These features are accomplished by means of the device disclosed in the drawings forming a part of the specification in which:

Fig. 2 is a top plan view of the machine;

Fig. 3 is an end view of the machine illustrating the driving means;

Fig. 4 is a vertical sectional view taken on the line 4—4 of Fig. 1;

Fig. 5 is a longitudinal sectional view taken through the conveyor means on the line 5—5 of Fig. 2;

Fig. 6 is a longitudinal vertical sectional view taken through the embellishing and discharge means on the line 6—6 of Fig. 2;

Fig. 7 is an enlarged fragmentary detail section taken on the line 7—7 of Fig. 6;

Fig. 8 is an enlarged detail plan illustrating the means for suspending the side walls on the frame; and Fig. 9 is a cross sectional view taken on the line 9—9 of Fig. 8.

Figure 1:
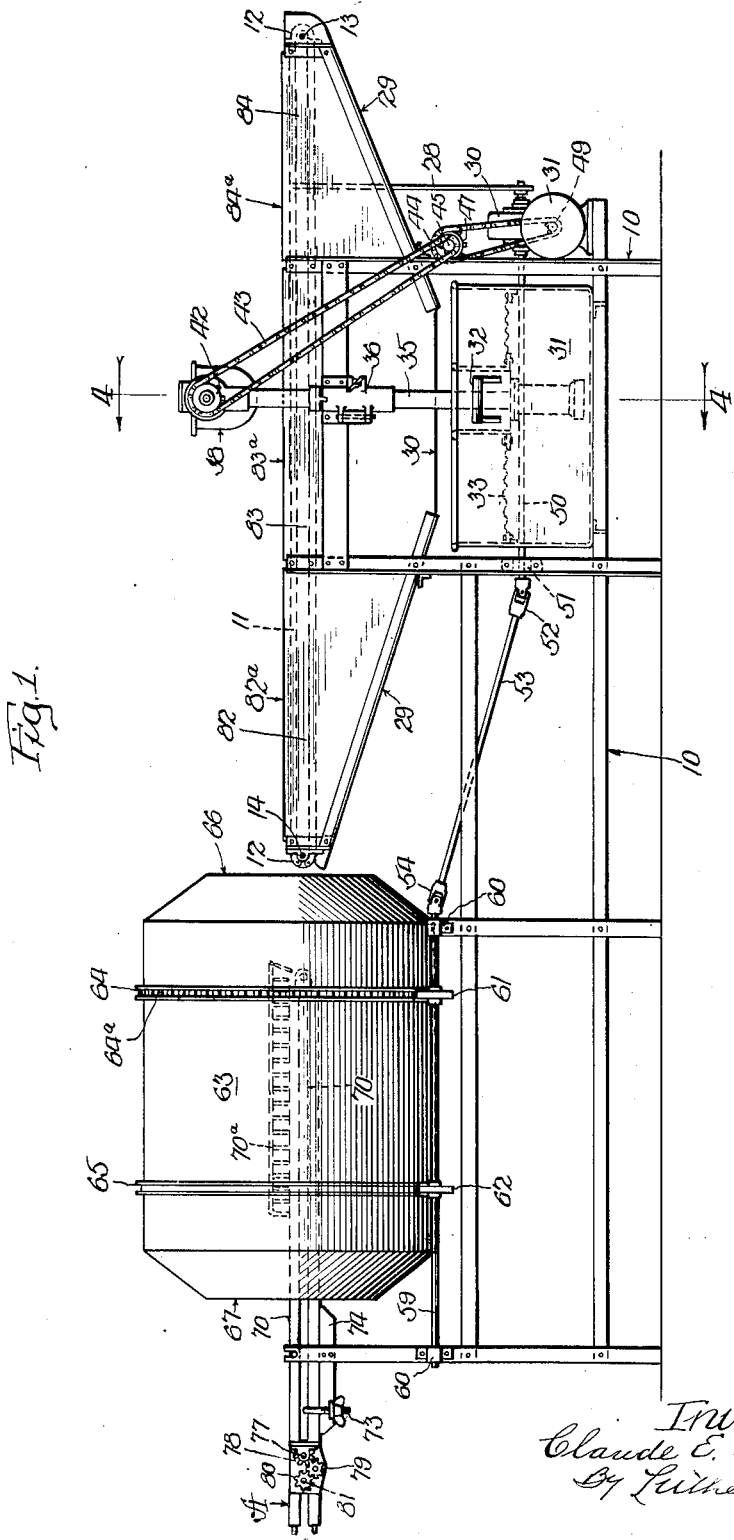
Fig. 1 is a side elevation of the machine.

Referring to the drawings 10 designates the frame of the machine as a whole, which has an endless feed conveyor 11 horizontally mounted thereon, and which is driven by means of the sprocket gears 12 fixed on the shafts 13 and 14 respectively which are journaled in bearings on the frame at each end of the conveyor. The shaft 13 is journaled in bearings 15 and 16 on each side of the frame and extends outwardly of the bearing 16 and has a bevel gear 17 fixed thereto, while the shaft 14 is journaled in the bearings 18 and 19 on the frame 10 and extends outwardly on the same side as the shaft 13 and has a bevel gear 20 fixed to the end thereof.

The bearings 16 and 19 have extending therefrom the bearings 21 and 22 respectively into which a relatively long shaft 23 is horizontally supported at a right angle to the shafts 13 and 14 and which has the bevel gears 25 and 26 respectively fixed to each end thereof, the bevel gear 25 of the shaft 23 being in meshing engagement with the bevel gear 17 while the bevel gear 26 at the other end of the shaft 23 is in meshing engagement with the bevel gear 20.

Fixed to the shaft 23 is a sprocket gear 27 having a chain 28 extending around a sprocket gear 29 of a reduction gearing 30 mounted on the frame 10 and which is driven by a motor 31 also mounted on the frame. As thus far described, the motor 31 will drive the reduction gearing 30 and by means of the sprocket 29, chain 28 and the sprocket 27, the shaft 23 will be driven, and by means of the bevel gears 25 and 17 and 26 and 20 the shafts 13 and 14 will be driven to drive each end of the conveyor 11.

To support the conveyor 11 on a horizontal plane, to prevent the same from sagging, the conveyor 11 is guided on a pair of angle-irons 32a and 32a extending the entire length of the conveyor on each side thereof and secured to the frame.

Below the feed conveyor 11 the device is provided with downwardly converging surfaces 29 extending from each end of the feed conveyor 11 and terminating at a point to form a space 30 therebetween. A supply tank 31 for an icing is removably supported on the frame below the opening 30 and is of a drawer-like type having handles 32 to withdraw the same for cleaning and refilling purposes and which is also provided with a screen 33 extending horizontally across the entire surface of the tank and above the icing level line. The screen 33 is provided with an opening 34 to permit a pump 35 to be lowered into the supply tank 31. The pump extends upwardly on one side of the frame and is removably held in position on the frame by means of a clamp 36. At its upper end the pump 35 is provided with a spout 37 which extends inwardly on one side into a distributing tank 38 supported on the frame above the feed conveyor 11.

The supply tank 31 is filled with an icing to a point below the screen 33 and the pump 35 elevates the icing from the supply tank into the distributing tank 38. The distributing tank is removably supported on either side of the frame by means of downwardly-extending finger portions 39 adapted to fit into cup-shaped members 40 on each side of the frame 10. The tank 38 is provided with an elongated slot 41 extending the entire width thereof so as to extend across the entire width of the feed conveyor 11.

The goods being carried by the feed conveyor at a uniform rate of speed under the distributing tank 38 the icing in said tank, which is of the gravity feed, will flow through the elongated slot 41 onto the goods and thoroughly and uniformly coat the same while they are in motion. The pump 35 is driven by means of a sprocket gear 42 which has a chain 43 extending around a sprocket gear 44 and which is fixed to a horizontally-extending counter-shaft 45 mounted in bearings 46 on both sides and at one end of the frame 10. Fixed to the countershaft 45 is a sprocket gear 47 and has a chain 48 extending around a sprocket 49 which is fixed to the shaft of a motor 31 to drive the mechanism.

As above described the motor 31 will drive the pump 35 at the required rate of speed by means of the gearing therebetween to elevate the icing from the supply tank 31 into the distributing tank 38 to maintain a constant supply in the tank 38 while the machine is in operation.

Through the reduction gearing 30 the motor 31 drives a horizontally-extending shaft 50, which has one end journaled in the reduction-gearing housing and in a bearing 51 at its other end on the frame 10. The shaft 50 has a universal joint 52 connecting a shaft 53 having a universal joint 54 at its other end and which is connected to a shaft 55. The shaft 55 is journaled on bearings 56 on one side of the frame and has a spur gear 57 fixed thereto and a roller 58 fixed on the shaft 55 and spaced from the gear 57.

A corresponding shaft 59 is journaled in bearings 60 on the other side of the frame 10, on a horizontal plane with the shaft 55 and has the rollers 61 and 62 secured thereon, the roller 61 being aligned with the gear 57 and the roller 62 being aligned with the roller 58.

A drum-like receiving means 63 provided with spaced-apart annular channels 64 and 65 is rotatably mounted on the gear 57 and roller 58 of the shaft 55 and the rollers 61 and 62 of the shaft 59. The channel 56 has a ring gear 64a therein which is in meshing engagement with the spur gear 57 on the shaft 55 to drive the drum 63.

Each end of the drum 63 is provided with a reduced opening 66 and 67 respectively for retaining the goods that are dropped therein. A plurality of porous baffles 68 are provided on the inner side of the drum 63 which extend at an angle from near the reduced opening 66 along the wall of the drum to about the center thereof. The baffles 68 extend at an angle to cause the goods dropped into the drum 63 to be moved toward the reduced opening 67 upon the rotation of the drum 63 in the operation of the machine. Extending from near the centre of the drum 63 to near the reduced opening 67 are longitudinally-and-radially-extending porous baffles 69 for receiving the goods directed from the angle baffles 68 to cause them to be raised to where they will drop off of the baffles 69 upon the rotating movement of the drum.

A discharge conveyor 70 extends about two-thirds of the distance into the drum 63 through the opening 67 and is positioned and secured to one end of the frame 10 by means of pins 71 extending outwardly on each side of the frame of the conveyor 70 and which fit into notches or recesses 72 in each side of the frame 10. A clamp 73 is mounted on a horizontal member 74 on each side of the frame 10 for holding the frame of the discharge conveyor 70 against the top face of the horizontal member 74. The discharge conveyor 70 is driven by the sprocket gears 75 fixed to the shafts 76 and 77 respectively, journaled in the frame of the conveyor. The shaft 77 extends outwardly of the frame of the discharge conveyor 70 and is provided with a spur gear 78 which is brought into meshing engagement with idler spur gear 79 when the conveyor is mounted on the frame. The idler gear is in meshing engagement with a spur gear 80 fixed to a shaft 81 of a continuous conveyor designated by the letter A outwardly of the machine.

The end of the discharge conveyor 70 that is in the drum 63 is spaced from the end of feed conveyor 11 providing a space therebetween, permitting the goods that have been coated with an icing to be dropped into the drum 63, while the drum is rotating. Any desired substance such as cocoanut, crumbs, etc. may be placed in the drum so that when the goods are dropped into the drum 63 while it is rotating the baffles 68 will cause them to be rolled in the substance which will adhere to the coating of icing on them, and during the rotating movement of the drum the goods will also be gradually moved into the path of the radial baffles 69 which will elevate and drop them onto the discharge conveyor 70 to be carried outwardly of the machine.

A guard 70a is provided on the discharge conveyor 70 for guiding the goods dropped thereon while they are being carried out of the drum 63.

It will be noted that the conveyor 70 receives its power outwardly of the machine and is driven by means of the spur gears 78, 79 and 80, which drives the discharge conveyor at the required rate of speed.

In order to thoroughly clean the machine as in the case of changing the flavors of the various kinds of icings in the supply and distributing tanks and of the substance within the drum, the machine is so constructed as to have its parts easily dismantled for such purposes.

The pump 35 is supported on the frame 10 by means of the clamp 36 which is released to remove the pump, then the drawer-like supply tanks may be removed. The side walls surrounding the feed conveyor 11 are of sections 82, 83 and 84 and are provided at their upper ends with overturned edges 82a, 83a and 84a and are adapted to be suspended on the angle-irons 32—32 of the frame and are easily removed to permit accessibility to the feed conveyor and the downwardly-converging surfaces 29. The discharge conveyor 70 is also adapted to be removed from the frame 10 by removing the clamps 73, then lifting the conveyor so as to cause the pins 71 to be clear of the notches 72. After the conveyor 70 has been removed, it is then possible to remove the drum 63 from the frame 10.

With a device as thus described it is possible to feed bakery goods at a very rapid rate of speed, and to thoroughly coat them with an icing and to embellish them, so that they will have a uniform appearance and will not be touched or handled during the entire operation.

I contemplate as being included in these improvements all such changes, variations and departures from what is thus specifically illustrated and described as fall within the scope of the appended claims.

I claim:

1. A machine of the character described, comprising in combination a frame, conveyor means on said frame for conducting bakery goods in a path, icing means in said path for coating the goods, a receiving and embellishing drum rotatably mounted on the frame and adapted to receive the goods from said conveyor, means within said receiving and embellishing drum for causing the goods to be elevated and discharged upon a discharge conveyor, and a discharge conveyor adapted to receive the goods and carry them out of the drum.

2. A device for coating bakery goods, comprising a frame, a horizontal feed conveyor, a horizontal discharge conveyor, a drum having one end surrounding a portion of the discharge conveyor with its other end adjacent the feed conveyor, a supply tank for an icing, conducting means having downwardly-converging surfaces extending from each end of the feed conveyor to the supply tank, a distributing tank having an elongated slot opening therein, a pump connecting the supply tank with the distributing tank impelling an icing into said distributing tank, side walls enclosing the feed conveyor, said downwardly-converging surfaces and the side walls directing the overflow of icing from said distributing tank to said supply tank, and means for actuating the device at a predetermined speed in the operation of the machine.

3. A machine of the character described, comprising in combination a frame, a horizontally-disposed conveyor on said frame for conducting bakery-goods in a path, means in said path for coating the goods with an icing, a horizontally-disposed discharge conveyor substantially at the elevation and in line with the first-mentioned conveyor, and a rotating hollow drum between adjacent ends of the said two conveyors, with means in the drum for discharging the goods onto the discharge conveyor.

4. A device for coating bakery goods, comprising in combination a frame, horizontal conveyor means on said frame for conducting the goods in a path, means for icing the goods in said path, a supply tank for icing and means for conducting icing therefrom to said icing means, receiving and embellishing means remote from the icing means, power means for actuating the movable mechanisms of the machine, and means for directing the overflow of icing from the icing means back to said supply tank, the supply tank being provided with a screen extending across the same above the icing level therein, to filter the icing conducted back to the supply tank.

5. A device for coating bakery goods, comprising a frame, a horizontal conveyor on said frame for conducting the goods in a path, a horizontal discharge conveyor substantially on the plane of the first-mentioned conveyor, an icing distributing tank in the path for coating said goods, an icing supply tank, a pump connecting the supply tank with the distributing tank, and receiving means for the goods rotatably mounted on the frame at one end of said first-mentioned conveyor and adapted to contain embellishing material, the receiving means being provided with means causing the coated goods to be rolled in the substance therein for embellishing the same, with means for elevating the goods onto the discharge conveyor.

CLAUDE E. QUICK.